United States Patent [19]
Jones

[11] Patent Number: 5,611,952
[45] Date of Patent: Mar. 18, 1997

[54] TEMPERATURE SENSOR PROBE AND SENSOR DETECTION CIRCUIT

[76] Inventor: Thaddeus M. Jones, 1302 High St., South Bend, Ind. 46601

[21] Appl. No.: 269,193

[22] Filed: Jun. 30, 1994

[51] Int. Cl.$^6$ .................................................. H05B 1/02
[52] U.S. Cl. ........................ 219/505; 219/481; 219/497; 219/501; 323/369
[58] Field of Search ................................. 219/505, 504, 219/488, 481, 497, 499, 501; 307/117; 323/366, 369

[56] References Cited

U.S. PATENT DOCUMENTS

| | | | |
|---|---|---|---|
| 3,702,921 | 11/1972 | Thelen | 219/501 |
| 4,198,581 | 4/1980 | Ahmed | 307/310 |
| 4,278,872 | 7/1981 | Koether et al. | 219/497 |
| 4,394,957 | 7/1983 | Newton, III | 236/49 |
| 4,404,462 | 9/1983 | Murray | 219/497 |
| 4,421,270 | 12/1983 | Raleigh et al. | 236/20 |
| 4,516,543 | 5/1985 | Abe et al. | 123/179 |
| 4,564,748 | 1/1986 | Gupton | 219/497 |
| 4,574,200 | 3/1986 | Racca et al. | 219/505 |
| 4,604,871 | 8/1986 | Chiu et al. | 62/130 |
| 4,633,885 | 1/1987 | Du Brucq et al. | 128/736 |
| 4,638,135 | 1/1987 | Aoki | 219/497 |
| 4,725,713 | 2/1988 | Lehrke | 219/308 |
| 4,745,262 | 5/1988 | Larsen | 219/492 |
| 5,043,692 | 8/1991 | Sites et al. | 338/28 |
| 5,057,669 | 10/1991 | Dennison | 219/501 |
| 5,365,040 | 11/1994 | Oka | 219/497 |
| 5,373,141 | 12/1994 | Ko | 219/497 |

*Primary Examiner*—Mark H. Paschall
*Attorney, Agent, or Firm*—R. Tracy Crump

[57] ABSTRACT

A sensor probe and sensor detection circuit used in an electronic temperature control circuit for preventing the control circuit from driving an external device such as a heater when the sensor probe has been disconnected from the control circuit. The sensor probe includes an NTC thermistor and a limiting resistor that are connected in parallel and potted in epoxy. The thermistor and limiting resistor of the sensor probe form part of a lower leg of a voltage divider in the control circuit. The sensor detection circuit compares the voltage signal generated by the sensor voltage divider to a predetermined threshold or ceiling voltage value. During normal operation, when the sensor probe is attached to the control circuit, the resistance of the sensor probe insures that the voltage signal from the sensor voltage divider remains within a predetermined voltage range and does not exceed the predetermined ceiling voltage value. When the sensor probe is disconnected from the control circuit, the resistance of the sensor voltage divider is decreased and the voltage signal exceeds the ceiling voltage value. When the voltage signal exceeds the ceiling voltage value, the sensor detection circuit interrupts the normal operation of the control circuit and shuts down the heater.

3 Claims, 5 Drawing Sheets

TEMPERATURE SENSOR PROBE AND SENSOR DETECTION CIRCUIT

This invention relates to a temperature sensor probe and sensor detection circuit in an electrical temperature control circuit for preventing the control circuit from driving an external device such as a heater when the sensor probe has been disconnected or severed from the control circuit.

BACKGROUND OF THE INVENTION

Negative temperature coefficient (NTC) thermistors are often used as the temperature sensing element in electrical temperature control circuits or thermostats. NTC thermistors are highly sensitive, stable, inexpensive to manufacture, and well suited for many temperature sensing applications. For NTC thermistors, a simple exponential model provides accurate results over a limited temperature range, suitable in most applications. The characteristic model of an NTC thermistor is expressed as $R=R_o*Exp(Beta/Temperature)$. Positive temperature coefficient (PTC) thermistors are available but suffer from poor stability and other problems that make them undesirable for many temperature sensing applications.

In a typical electrical temperature control circuit, a NTC thermistor is used as part of a voltage divider to generate a temperature varying voltage signal. The control circuit uses the temperature varying voltage signal to activate or deactivate a relay, which controls the operation of a heater, fan or cooling unit. Often the thermistor is located a considerable distance from the control circuit. Consequently, the lead wires between the thermistor and control circuit are subject to accidental damage and severing. When the connection between the thermistor and control circuit is severed or disconnected, the control circuit can not distinguish between a low temperature condition and a broken or cut lead wire. This severed condition can cause the unregulated control circuit to continuously operate the heater, which may result in collateral damage due to excessive heat or a fire hazard.

SUMMARY OF THE INVENTION

The temperature sensor probe and sensor detection circuit of this invention is used in an electronic temperature control circuit for preventing the control circuit from driving an external device such as a heater when the sensor probe has been disconnected from the control circuit. The sensor probe includes an NTC thermistor and a limiting resistor that are connected in parallel and potted in epoxy. The thermistor and limiting resistor of the sensor probe form part of the lower leg of a sensor voltage divider, which establishes a temperature varying voltage signal in the control circuit. The control circuit uses the voltage signal to toggle an external relay, which controls the heater. The sensor detection circuit, which is incorporated into the control circuit, compares the voltage signal generated by the sensor voltage divider to a predetermined threshold or ceiling voltage value. During normal operation, when the sensor probe is attached to the control circuit, the resistance of the sensor probe insures that the voltage signal from the sensor voltage divider remains within a predetermined voltage range and does not exceed the ceiling voltage value. When the sensor probe is disconnected from the control circuit, the resistance of the sensor probe is lost and the voltage signal exceeds the ceiling voltage value. When the voltage signal exceeds the ceiling voltage value, the detection circuit interrupts the normal operation of the control circuit and shuts down the heater. Consequently, the sensor probe and sensor detection circuit prevent the control circuit from driving the heaters without active feedback from the sensor probe.

The sensor probe and sensor detection circuit of this invention can be incorporated into any electrical temperature control circuit. In one embodiment of this invention, the sensor probe and sensor detection circuit are incorporated into an analog temperature control circuit. In the analog embodiment, operational amplifiers are used as voltage comparators to produce the logic for the temperature control circuit and the sensor detection circuit. In another embodiment, the sensor probe and sensor detection circuit are part of a digital temperature control circuit, which includes an analog-to-digital converter (ADC) and a microprocessor. The ADC converts the voltage signal from the sensor voltage divider into a digital representation. Based on the digital representation, the microprocessor can determine if the sensor probe is connected or disconnected from the control circuit.

Accordingly, an advantage of this invention is to provide for a temperature sensor probe and a sensor detection circuit used in an electronic temperature control circuit that prevents the control circuit from driving an external heater or similar device when the sensor probe is disconnected or severed from the control circuit.

Another advantage of this invention is to provide a temperature sensor probe used in an electrical temperature control circuit that is used to establish a temperature varying voltage signal, which is limited within a predetermined range when the sensor probe is connected to the control circuit and can be monitored by a sensor detection circuit for determining when the sensor probe is disconnected or severed from the control circuit.

Another advantage is to provide for a temperature sensor probe used in an electronic temperature control circuit that includes a thermistor and a resistor connected in parallel adjacent the thermistor which limits the sensor probe's resistance.

Other advantages will become apparent upon a reading of the following description.

BRIEF DESCRIPTION OF THE DRAWINGS

A preferred embodiment of the invention has been depicted for illustrative purposes only wherein.

DESCRIPTION OF THE PREFERRED EMBODIMENT

The preferred embodiments herein described are not intended to be exhaustive or to limit the invention to the precise forms disclosed. They are chosen and described to explain the principles of the invention and its application and practical use to enable others skilled in the art to utilize their teachings.

Figure 1:
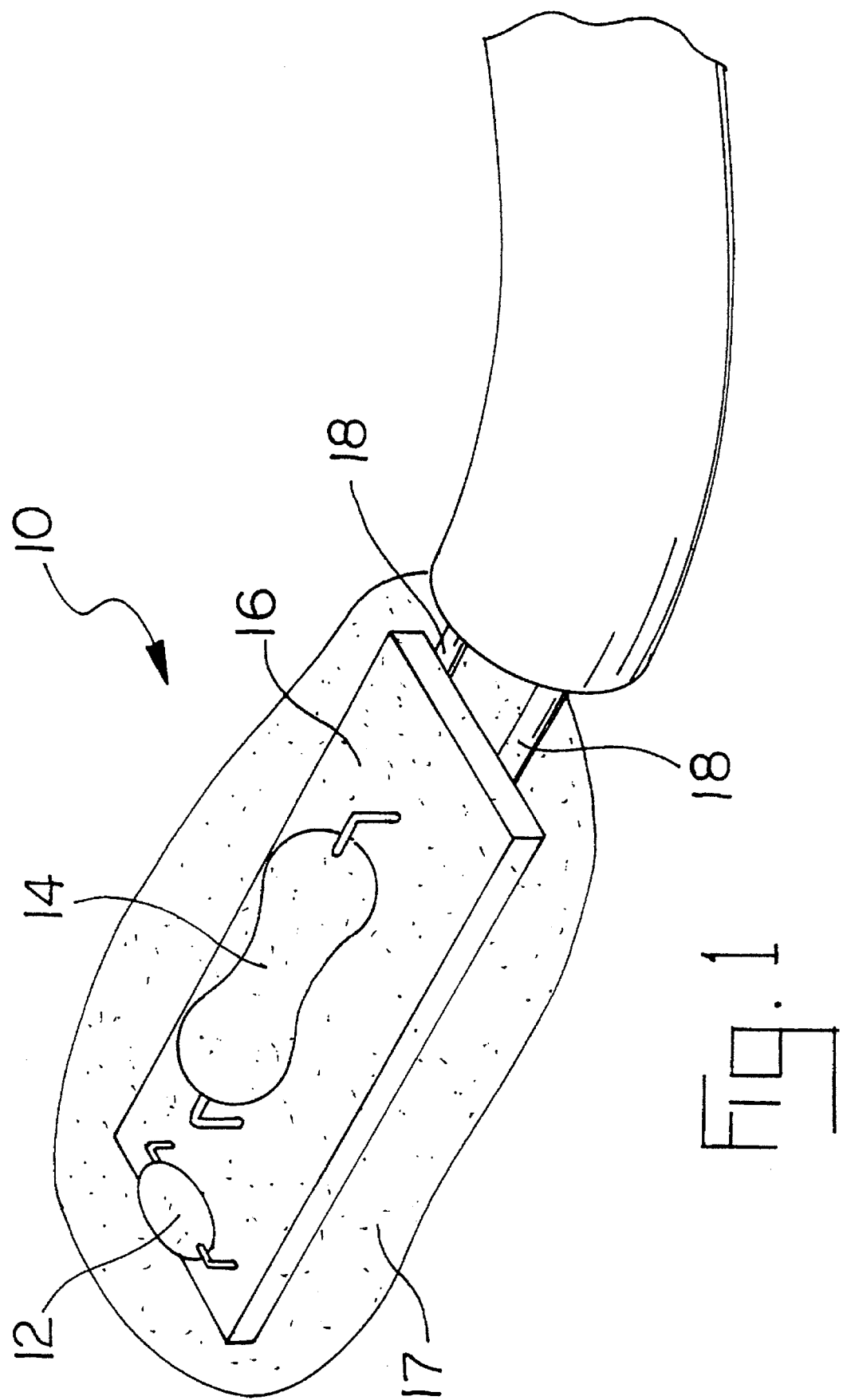
FIG. 1 is a perspective view of the sensor probe of this invention.

FIG. 1 shows the temperature sensor probe 10 of this invention. Sensor probe 10 includes an NTC thermistor 12 and a shunt or limiting resistor 14 connected in parallel. Preferably, thermistor 12 and limiting resistor 14 are mounted to a circuit board 16 and potted together in a protective epoxy 17. Thermistor 12 and limiting resistor 14 are potted together to insure that they remain as a single unit. Sensor probe 10 is connected to a thermostat or control circuit by jacketed wires 18. The length of wires 18 allows sensor probe 10 to be remotely located from the thermostat in a typical application.

Figure 2:
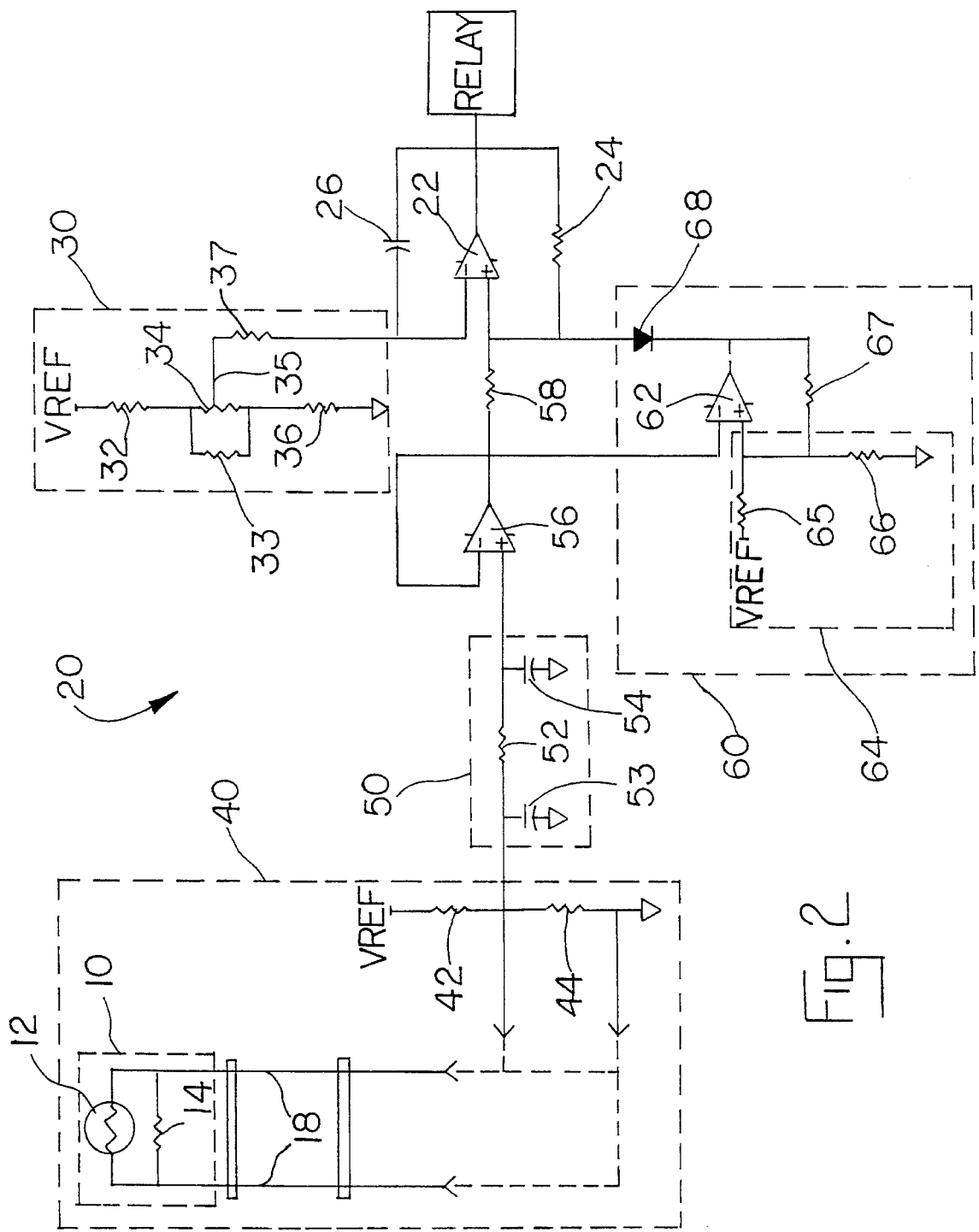
FIG. 2 is a schematic drawing of one embodiment of an analog temperature control circuit including the sensor probe and sensor detection circuit of this invention.

FIG. 2 shows an analog temperature control circuit 20 which includes the sensor detection circuit 60 and sensor probe 10 of this invention. Preferably, control circuit 20 uses the operational amplifiers of a conventional quad operational amplifier integrated circuit to produce both the temperature control logic and the sensor detection logic. As shown in FIG. 2, two amplifiers 22 and 24 are used as voltage comparators. The output from amplifier 22 is used to switch an external relay 2, which controls the operation of a heater, or other external device (not shown). The output of amplifier 24 is used to interrupt the operation of amplifier 22 when sensor probe 10 is disconnected from control circuit 20.

The operational set point of control circuit 20 is established by a set point voltage divider 30. A reference voltage $V_{ref}$ is fed through set point voltage divider 30 to establish a fixed voltage signal at the inverting (−) input of amplifier 22. As shown in FIG. 2, set point voltage divider 30 includes a potentiometer 34 and resistors 32 and 36 connected in series. In addition, a resistor 33 is connected between resistors 32 and 36 and parallel to potentiometer 34. The moving contact 35 of potentiometer 34 is connected to inverting (−) input of amplifier 22 across a resistor 37. By adjusting potentiometer 34, a user can adjust the value of the voltage signal to correspond to a specific temperature set point.

As shown in FIG. 2, sensor probe 10 forms part of a sensor voltage divider 40. Reference voltage $V_{ref}$ is fed through sensor voltage divider 40 to produce a temperature varying voltage signal. Sensor voltage divider 40 includes a resistor 42, which forms the upper leg of the voltage divider and a resistor 44, which forms the lower leg of the voltage divider. Thermistor 12 and limiting resistor 14 of sensor probe 10 are connected in parallel to resistor 44 to form part of the lower leg of sensor voltage divider 40. Resistor 42 is selected to linearize the voltage output from sensor voltage divider 40 as a function of temperature within a desired temperature range. Resistor 44 is selected to ensure that the output voltage signal satisfies the common mode voltage of the operational amplifier integrated circuit used in control circuit 20.

The voltage signal from sensor voltage divider 40 is fed through a low pass filter 50 and is buffered by an amplifier 56. Low pass filter 50 includes a resister 52 and capacitors 53 and 54, each connected to ground. Filter 50 attenuates the voltage signal from sensor voltage divider 40, which prevents induced pick-up from sensor probe 10 and its lead wires 18. Amplifier 56 acts as a buffer amplifier to isolate the voltage signal from extraneous circuit noise. The voltage signal from amplifier 56 is fed through resistor 58 into the non-inverting (+) input of amplifier 22.

Amplifier 22 compares the temperature varying voltage signal at its non-inverting (+) input against the set voltage signal at its inverting (−) input to generate an output which turns external relay 2 on or off. When the voltage signal at the non-inverting (+) input exceeds the set voltage signal at the inverting (−) input, the output of amplifier 22 is high, which activates relay 2. When the voltage signal at the non-inverting (+) input is less than the set voltage signal at the inverting (−) input, the output of amplifier 22 drops to ground potential, which deactivates relay 2.

As shown in FIG. 2, the output from amplifier 22 is also fed back through a resistor 24 to its non-inverting (+) input to add a hysteresis voltage. Resistor 24 provides the hysteresis effect of the control circuit and a dead band of operation. In addition, the output of amplifier 22 is fed back through a capacitor 26 to its inverting (−) input, which slows the switching of amplifier 22 between its high output and its low output.

A sensor detection circuit 60 is connected between amplifier 56 and amplifier 22. Sensor detection circuit 60 includes amplifier 62 and a voltage divider 64, which provides a voltage signal with a threshold or ceiling voltage value. Again, the reference voltage $V_{ref}$ is fed through ceiling voltage divider 64, which generates the ceiling voltage signal. Ceiling voltage divider 64 includes resistors 65 and 66. The ceiling voltage signal is fed into the non-inverting input (+) of amplifier 62. The voltage signal from amplifier 56 is connected to the inverting (−) input of amplifier 62. The output of amplifier 62 is connected to the non-inverting (+) input of amplifier 22 through a diode 68. The output of amplifier 62 is also connected back through a resistor 67 to its non-inverting (+) input to add a hysteresis voltage.

Figure 3:
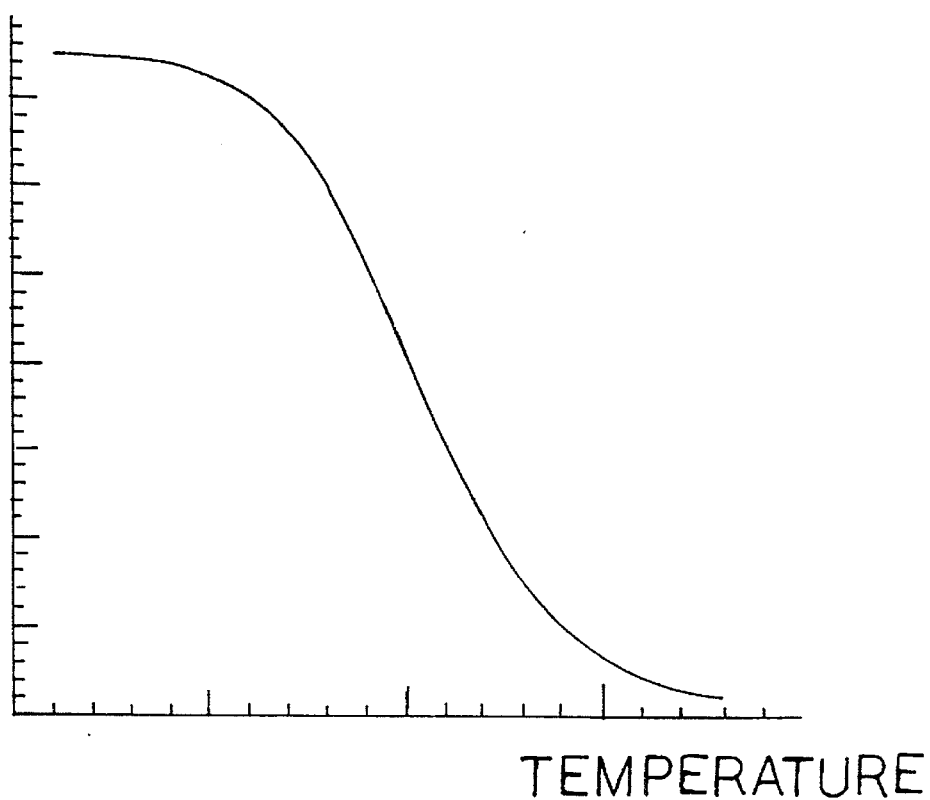
FIG. 3 is a graph of the resistance of the sensor probe of this invention plotted against temperature.
Figure 4:
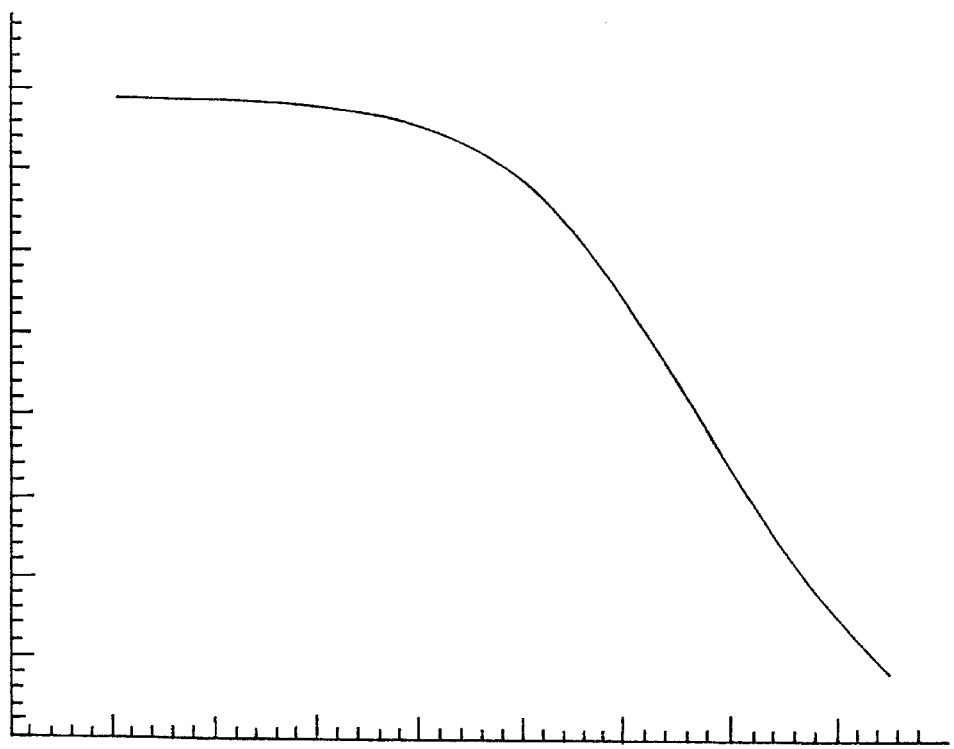
FIG. 4 is a graph of the temperature varying voltage signal of the control circuit of FIG. 2 plotted against temperature.

As shown in FIGS. 3 and 4, low ambient temperatures increase the resistance of sensor probe 10, which in turn increases the voltage signal from amplifier 56. As the ambient temperature increases, the sensor probe's resistance decreases and the voltage signal from amplifier 56 decreases. Limiting resistor 14 limits the resistance of sensor probe 10 to a maximum or ceiling resistance. Consequently, the voltage signal from amplifier 56 is limited within a predetermined operational range when the sensor probe is connected to control circuit 20. The upper end of the voltage range is limited by the resistance of sensor probe 10. As long as sensor probe 10 is connected to control circuit 20, the voltage signal at the inverting input of amplifier 62 will remain within this voltage range and will not exceed the ceiling voltage signal at the non-inverting (+) input of amplifier 62. As long as the voltage signal at the inverting (−) input of amplifier 62 is less than the ceiling voltage signal at its non-inverting (+) input, the output of amplifier 62 is high (in this case $V_{ref}$) and releases control of amplifier 22. Diode 68 prevents the high output signal from amplifier 62 from being applied to amplifier 22. Consequently, sensor detector circuit 60 has no effect on the operation of control circuit 20 when sensor probe 10 is connected to the circuit.

When sensor probe 10 is disconnected from control circuit 20 or wires 18 are severed, the voltage signal from amplifier 56 increases beyond the ceiling voltage signal in the absence of the resistance of sensor probe 10 i.e., thermistor 12 and limiting resistor 14. When the voltage signal at the inverting (−) input of amplifier 62 exceeds the ceiling voltage signal at its non-inverting (+) input, the output of amplifier 62 goes low, i.e., to ground potential. Consequently, the voltage signal fed into the non-inverting (+) input of amplifier 22 is drained across diode 68 to a value near ground potential. Once the voltage signal at the non-inverting (+) input of amplifier 22 drops to ground, the output of amplifier 22 goes to ground and turns off external relay 2. Consequently, sensor probe 10 and sensor detection circuit 60 prevent circuit 20 from driving the heater or other external device without active feedback from the sensor probe.

Figure 5:
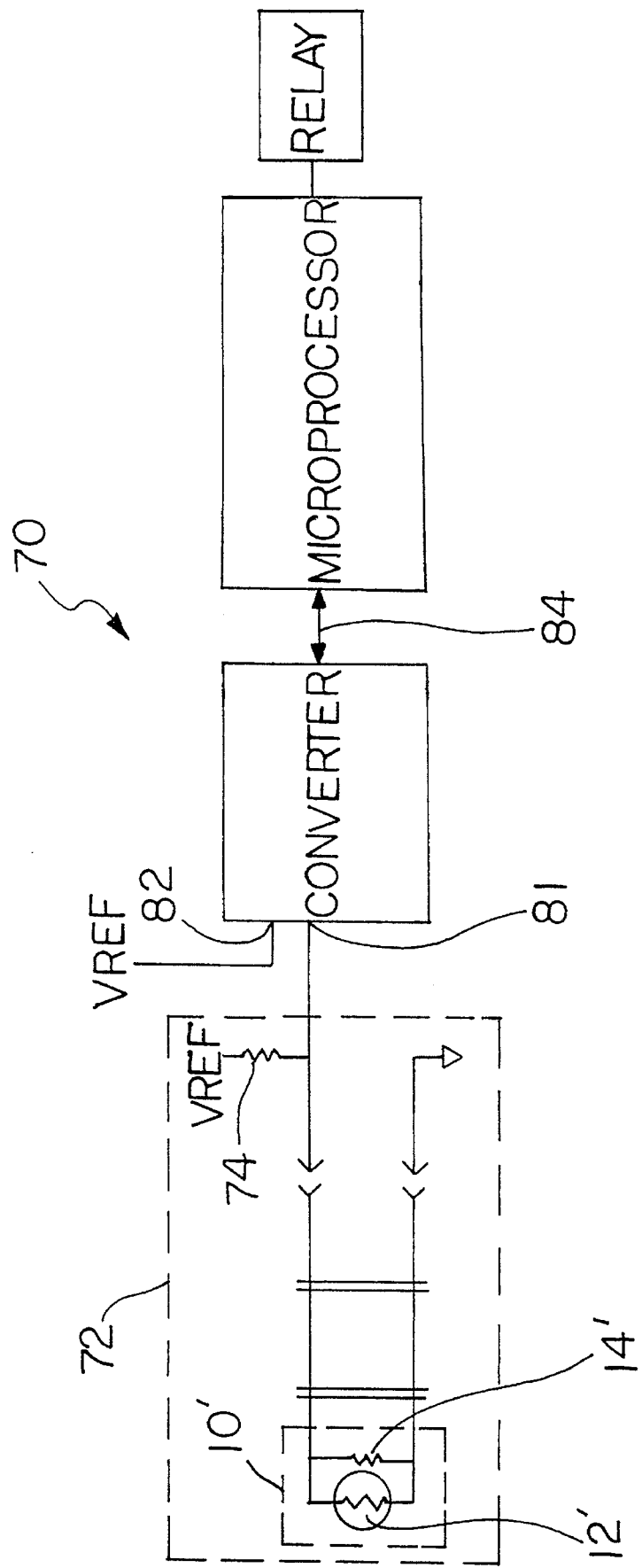
FIG. 5 is a schematic drawing of another embodiment of a digital temperature control circuit including the sensor probe and sensor detection circuit of this invention.

FIG. 5 shows a digital embodiment of a temperature control circuit 70 which uses the sensor probe 10' of this invention. As shown, control circuit 70 includes an analog-to-digital converter (ADC) 80 and a microprocessor 86. Sensor probe 10' forms the lower leg of a voltage divider 72 whose output is fed into the signal input of ADC 80. A resistor 74 forms the upper leg of the voltage divider. Resistor 74 is selected to linearize the output of voltage divider 72 as a function of temperature within a desired temperature range. A reference voltage $V_{ref}$ is applied through voltage divider 72 to produce a voltage signal at input 81 of ADC 80. The voltage signal is sampled and converted by ADC 80 into a representative digital output. ADC 80 transmits the digital output in serial or parallel format to microprocessor 86 across bus 84. The digital output signal from ADC 80 ranges in value between a low or zero voltage and a maximum or ceiling value established in this embodiment by reference voltage $V_{ref}$ fed into input 82 of ADC 80.

Under normal operating conditions, the digital output is linear with respect to temperature, which allows microprocessor 86 to calculate the sensed temperature from sensor probe 10'. Based on the digital output, microprocessor 86 can toggle an external relay 2' as required to activate or deactivate a heating or cooling unit (not shown). When sensor probe 10 is attached to control circuit 70, the voltage signal sampled by ADC 80 is less than reference voltage $V_{ref}$. The resistance of resistor 14' is sufficient to maintain the voltage signal sampled by ADC 80 below reference voltage $V_{ref}$. Consequently, the digital output is always less than its ceiling value when sensor probe 10' is connected to control circuit 70. When sensor probe 10 is disconnected from control circuit 70, the voltage signal sampled by ADC 80 increases to the reference voltage in absence of the resistance of thermistor 12' and resistor 14'. Consequently, ADC 80 outputs a digital signal at the ceiling value. Microprocessor 86 recognizes the ceiling value as a failure condition and deactivates external relay 2'.

It is understood that the above description does not limit the invention to the details given, but may be modified within the scope of the following claims.

I claim:

1. In combination, an electrical temperature control circuit for controlling the operation of a heater, and a remote temperature sensor probe, said sensor probe being connected to said circuit by only two electrical wires, the improvement comprising:

said combination including means for detecting an open sensor condition when one of said wires is severed, said sensor probe including a thermistor for sensing a temperature and producing a resistance proportional to said temperature, and second resistance means connected to said thermistor for establishing a maximum resistance for said sensor probe when said sensor probe is connected to said circuit, said circuit including means for generating an electrical signal across said sensor probe whereby said maximum resistance limits said signal below a predetermined signal value when said sensor probe is connected to said circuit, logic means responsive to said signal for providing an output to control the operation of said heater, and means operatively connected to said logic means and responsive to said signal for deactivating the operation of said heater when said signal exceeds said predetermined signal value.

2. The combination of claim 1 wherein said minimum resistance means includes a resistor connected in parallel to said thermistor.

3. The combination of claim 1 wherein said packaging means includes an epoxy covering.

* * * * *